(12) United States Patent
Haikonen

(10) Patent No.: US 6,625,588 B1
(45) Date of Patent: Sep. 23, 2003

(54) ASSOCIATIVE NEURON IN AN ARTIFICIAL NEURAL NETWORK

(75) Inventor: Pentti Haikonen, Helsinki (FI)

(73) Assignee: Nokia OYJ, Espoo (FI)

( * ) Notice: Subject to any disclaimer, the term of this patent is extended or adjusted under 35 U.S.C. 154(b) by 0 days.

(21) Appl. No.: 09/381,825

(22) PCT Filed: Mar. 23, 1998

(86) PCT No.: PCT/FI98/00257

§ 371 (c)(1),
(2), (4) Date: Sep. 24, 1999

(87) PCT Pub. No.: WO98/43159

PCT Pub. Date: Oct. 1, 1998

(30) Foreign Application Priority Data

Mar. 26, 1997 (FI) .................................................. 971284

(51) Int. Cl.[7] .......................... G06N 3/06; G06N 3/063; G06N 3/067; G06F 15/18; G06J 1/00
(52) U.S. Cl. .............................. 706/33; 706/34; 706/37; 706/38; 706/41; 706/18
(58) Field of Search .............................. 706/33, 34, 37, 706/38, 41, 18

(56) References Cited

U.S. PATENT DOCUMENTS

| | | | | |
|---|---|---|---|---|
| 3,601,811 A | * | 8/1971 | Yoshino ....................... | 706/25 |
| 3,602,888 A | * | 8/1971 | Nishiyama et al. ............. | 711/7 |
| 3,638,196 A | * | 1/1972 | Nishiyama et al. ........... | 706/34 |
| 4,874,963 A | * | 10/1989 | Alspector ..................... | 706/34 |
| 5,172,204 A | * | 12/1992 | Hartstein ..................... | 706/33 |
| 5,257,343 A | * | 10/1993 | Kyuma et al. ................. | 706/18 |
| 5,299,285 A | | 3/1994 | Tawel .......................... | 706/25 |
| 5,394,511 A | * | 2/1995 | Mashiko ....................... | 706/33 |
| 5,446,829 A | * | 8/1995 | Wang et al. ................... | 706/21 |
| 5,454,064 A | * | 9/1995 | Castelaz ....................... | 706/18 |
| 5,467,429 A | | 11/1995 | Uchimura et al. ............. | 706/26 |
| 5,515,454 A | * | 5/1996 | Buckley ....................... | 382/157 |
| 5,535,309 A | | 7/1996 | Shin et al. .................... | 706/26 |

FOREIGN PATENT DOCUMENTS

| | | |
|---|---|---|
| EP | 0 653 714 | 5/1995 |
| EP | 0 694 856 | 1/1996 |

OTHER PUBLICATIONS

Hauanglin Zeng et al; On Dynamics of a Learning Feedback Associative Memory; Feb. 1995; IEEE; 0–7803–2570–2/95; 1144–1147.*

L. Chen et al; Hybred architecture for analogue neural network and its circuit implementation; Apr. 1996; IEEE; Proc. Circuits, devices, Syst., Vol 143, No2; 123–128.*

A.K. Jain et al., "Artificial Neural Networks: A Tutorial", IEEE Computer, vol. 29, No. 3, pp. 31–44, (1996).

* cited by examiner

Primary Examiner—Ramesh Patel
Assistant Examiner—Joseph P. Hirl
(74) Attorney, Agent, or Firm—Pillsbury Winthrop LLP

(57) ABSTRACT

An associative artificial neuron and method of forming output signals of an associative artificial neuron includes receiving a number of auxiliary input signals; forming from the auxiliary input signals a sum weighted by coefficients and applying a non-linear function to the weighted sum to generate a non-linear signal. The neuron and method further include receiving a main input signal and forming, based on the main signal and the non-linear signal, the function S OR V, which is used to generate a main output signal, and at lest one of three logical functions S AND V, NOT S AND V, and S AND NOT V. The at least one logical function is used to generate an additional output signal for the associative artificial neuron.

22 Claims, 3 Drawing Sheets

ASSOCIATIVE NEURON IN AN ARTIFICIAL NEURAL NETWORK

BACKGROUND OF THE INVENTION

The invention relates to an associative neuron used in artificial neural networks.

In artificial neural networks, neurons derived from the McCullogh-Pitts (1943) neuron, such as different versions of the perceptron (Frank Rosenblatt 1957), are used. Neural networks are discussed, for example, in the article "Artificial Neural Networks: A Tutorial" by Anil K. Jain, Jianchang Mao and K. M. Mohiuddin in IEEE Computer, March 1996, p. 31 to 44.

In FIG. 1, signals $X_1$, to $X_n$ are inputs of an artificial neuron and Y is its output signal. The values of the input signals $X_1$, to $X_n$ can be continuously changing (analogous) or binary quantities, and the output signal Y can usually be given both positive and negative values. $W_1$ to $W_n$ are weighting coefficients, i.e. synaptic weights, which can also be either positive or negative. In some cases, only positive signal values and/or weighting coefficients are used. Synapses $11_1$ to $11_n$ of the neuron weight the corresponding input signal by the weighting coefficients $W_1$ to $W_n$. A summing circuit 12 calculates a weighted sum U. The sum U is supplied to a thresholding function circuit 13, whose output signal is V. The threshold function can vary, but usually a sigmoid or a piecewise linear function is used, whereby the output signal is given continuous values. In a conventional neuron, the output signal V of the thresholding function circuit 13 is simultaneously the output signal Y of the whole neuron.

When neurons of this kind are used in artificial neural networks, the network must be trained, i.e. appropriate values must be found for the weighting coefficients $W_1$ to $W_n$. Different algorithms have been developed for the purpose. A neural network that is capable of storing repeatedly supplied information by associating different signals, for example a certain input with a certain situation, is called an associative neural network. In associative neurons, different versions of what is known as the Hebb rule are often used. According to the Hebb rule, the weighting coefficient is increased always when the input corresponding to the weighting coefficient is active and the output of the neuron should be active. The changing of the weighting coefficients according to tie algorithms is called the training of the neural network.

From previously known artificial neurons, it is possible to assemble neural networks by connecting neurons in parallel to form layers and by arranging the layers one after the other. Feedback can be implemented in the networks by feeding output signals back as input signals. In wide networks assembled from neurons, however, the meaning of individual signals and even groups of signals is blurred, and the network becomes more difficult to design and manage. To produce an attention effect, for example, the network operations would have to be strengthened in one place and weakened in another, but the present solutions do not provide any clear answers to where, when and how this should be done, and in what way.

BRIEF DESCRIPTION OF INVENTION

The object of the invention is to provide a method and equipment implementing the method in which the above problems of training a neural network can be solved. To put it more precisely, the object of the invention is to provide a mechanism by which useful additional information can be produced on the level of an individual neuron about the relations between the different input signals of the neuron. The mechanism must be flexible and versatile to make artificial neurons widely applicable. The mechanism must also be fairly simple so that the costs of manufacturing neurons can be kept low.

The object of the invention is achieved by a method and equipment that are characterized by what is stated in the independent claims. The preferred embodiments of the invention are claimed in the dependent claims.

The invention is based on expansion of a conventional neuron such that a specific expansion, i.e. nucleus, is attached to the conventional neuron, a specific main input signal, i.e. main signal, passing through the nucleus. The nucleus keys and adjusts the main signal by a signal obtained from the conventional part of the neuron, and forms between these signals logical operations and/or functions needed to control neural networks. The processing power of a single neuron is thus increased as compared with the previously known neurons, which process data only by means of weighting coefficients and threshold functions. On the other hand, a clear distinction between main signals and auxiliary signals makes neural networks easier to design, since the training according to the Hebb rule is then easy to implement in such a way that each weighting coefficient is increased always when the main signal and the auxiliary input signal concerned are simultaneously active.

On the basis of the main signal (S) and a non-linear signal (V), the function $(S_o)S$ OR V is formed in the neuron of the invention and used to generate a main output signal, and in addition, at least one of the three logical functions $Y_O = S$ AND V, $N_O = $ NOT S AND V, $N_a = S$ AND NOT V is formed and used to generate an additional output signal for the neuron.

The neuron of the invention and the network consisting of such neurons learn quickly: even one example may suffice. The operation of the neuron of the invention and that of the networks consisting of such neurons are simple and clear.

BRIEF DESCRIPTION OF DRAWINGS

The invention will now be described in greater detail by means of preferred embodiments and with reference to the attached drawings, in which.

DETAILED DESCRIPTION OF INVENTION

Figure 1:
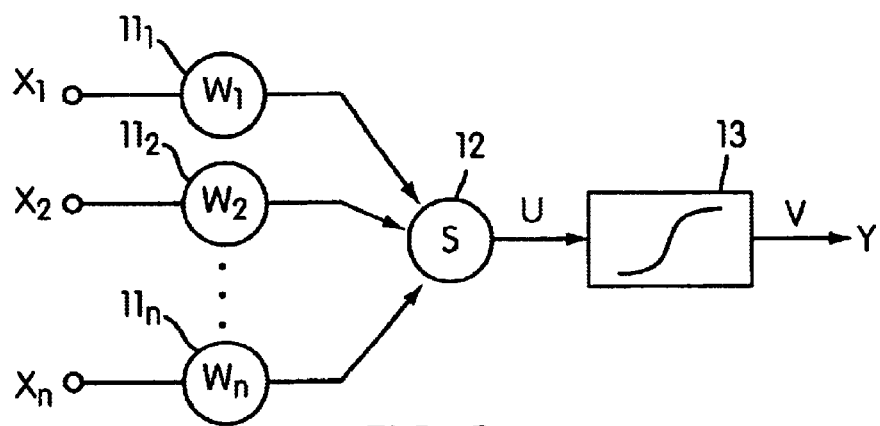
FIG. 1 is a general view of an artificial neuron.
Figure 2:
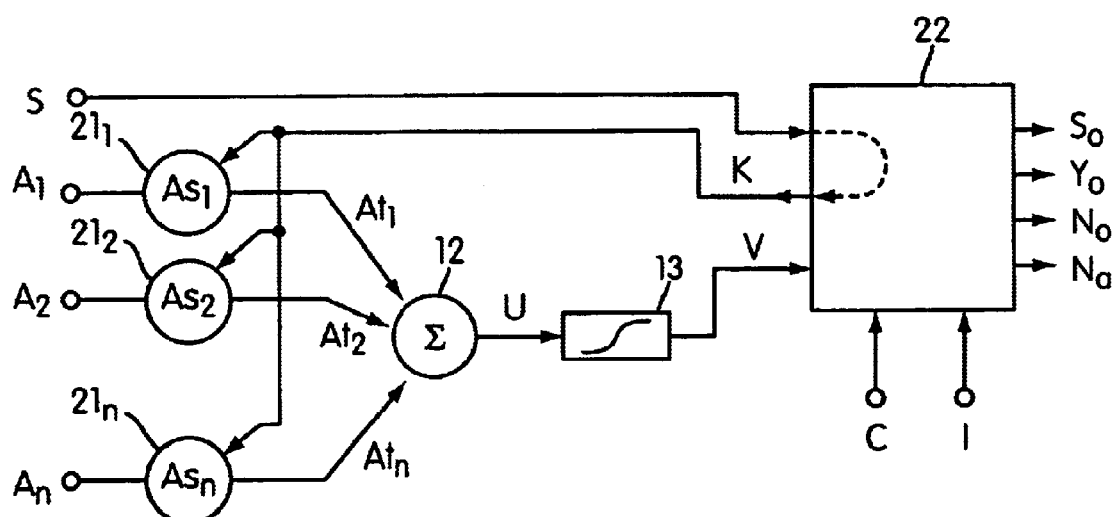
FIG. 2 is a general view of a neuron of the invention.

In FIG. 2, the neuron according to a preferred embodiment of the invention comprises a main signal input S, an arbitrary number of auxiliary signal inputs $A_1, A_2, \ldots, A_n$, at least one controlling input C and at least one inhibiting input $I_1$, and a number of outputs. In the example of FIG. 2 the main output signal of the neuron is $S_0$, and $Y_0$, $N_o$ and $N_a$ (or one/some of them) are auxiliary output signals. The input and output signals can be, for example, voltage levels.

Blocks $21_1, 21_2, \ldots, 21_n$ are synapses of the neuron, in which the weighting coefficient corresponding to the auxiliary signal $At_1, A_2, \ldots, A_n$ concerned is stored. In practice, the synapses are, for example, circuit units. Block 12 is a summing circuit, in which the output signals $At_1, \ldots, At_3$ of the synapses $21_1, 21_2, \ldots, 21_n$ are summed. Block 13 is a thresholding circuit, which can be implemented simply as a comparator, which supplies an active output signal only if its input signal level, i.e. the output signal level of the summing circuit 12, exceeds a pre-set threshold value.

Block 22 comprises the neuron expansions of the invention. In the present application, the expansions are called the nucleus of the neuron. The function of the nucleus is, for example, to key and adjust the main signal S on the basis of the output signal of the thresholding circuit 13 and to form logical operations and/or functions between the signals. Particularly useful logical operations are the logical OR (signal $S_O$) and the logical AND (signal $Y_O$). Other logical operations can also be used in the same way as AND so that the main signal S is inverted first (signal $N_O$) or so that the output signal V of the thresholding circuit 13 is inverted first (signal $N_a$).

Figure 3:
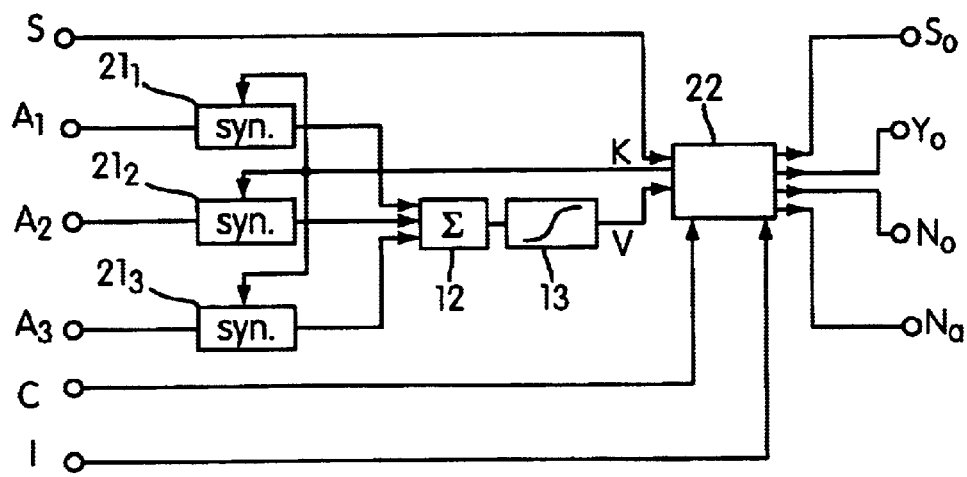
FIG. 3 is a block diagram of the neuron of the invention.

In a preferred embodiment of the invention, the nucleus 22 also comprises circuitry that deactivates the output signal $S_O$ when a certain period of time has passed from the initiation of the signal, irrespective of what happens in the inputs of the neuron. The circuitry can also take care that a new output pulse cannot be initiated until a certain period of recovery has passed. To the nucleus 22 can also be connected an inhibiting input signal I (Inhibit), which inhibits all outputs when activated (forces them to an inactive state). The control input signal C (Control) controls the synapses' learning. FIG. 3 is a block diagram of a neuron of the invention, the neuron here comprising three auxiliary signal inputs $A_1$ to $A_3$ and therefore three synapses $21_1$ to $21_3$ in addition to the main signal input. The expanded neuron of the invention can be implemented in various ways within the scope of the inventive idea disclosed above.

Figure 4:
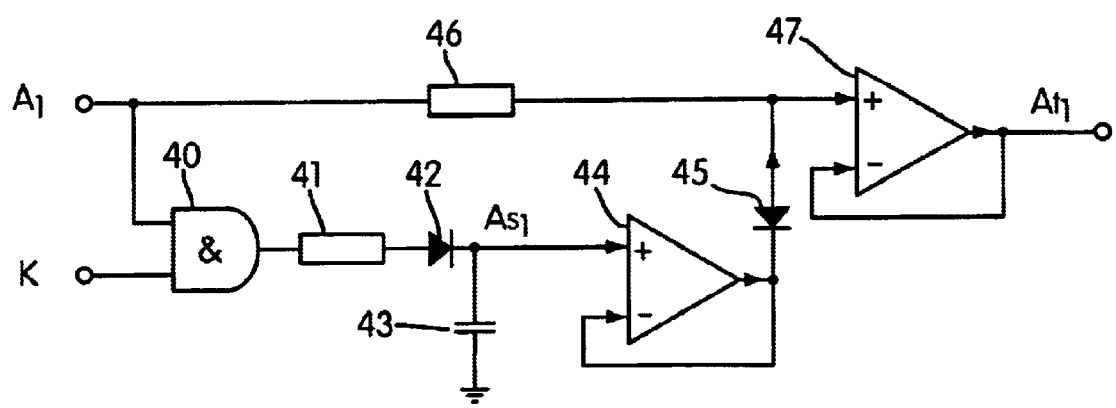
FIGS. 4 to 6 illustrate ways of implementing specific details of the neuron of the invention.
Figure 5:
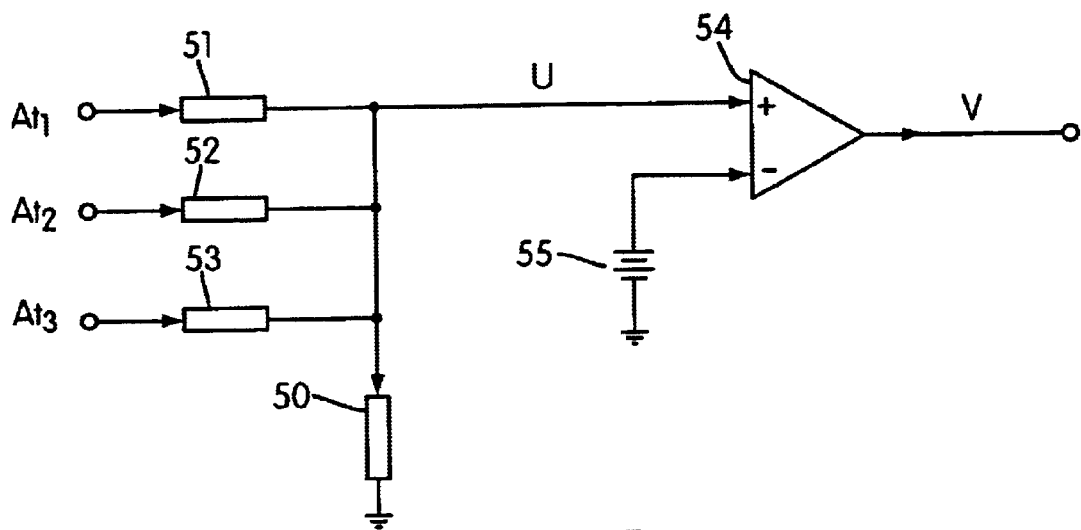
Figure 6:
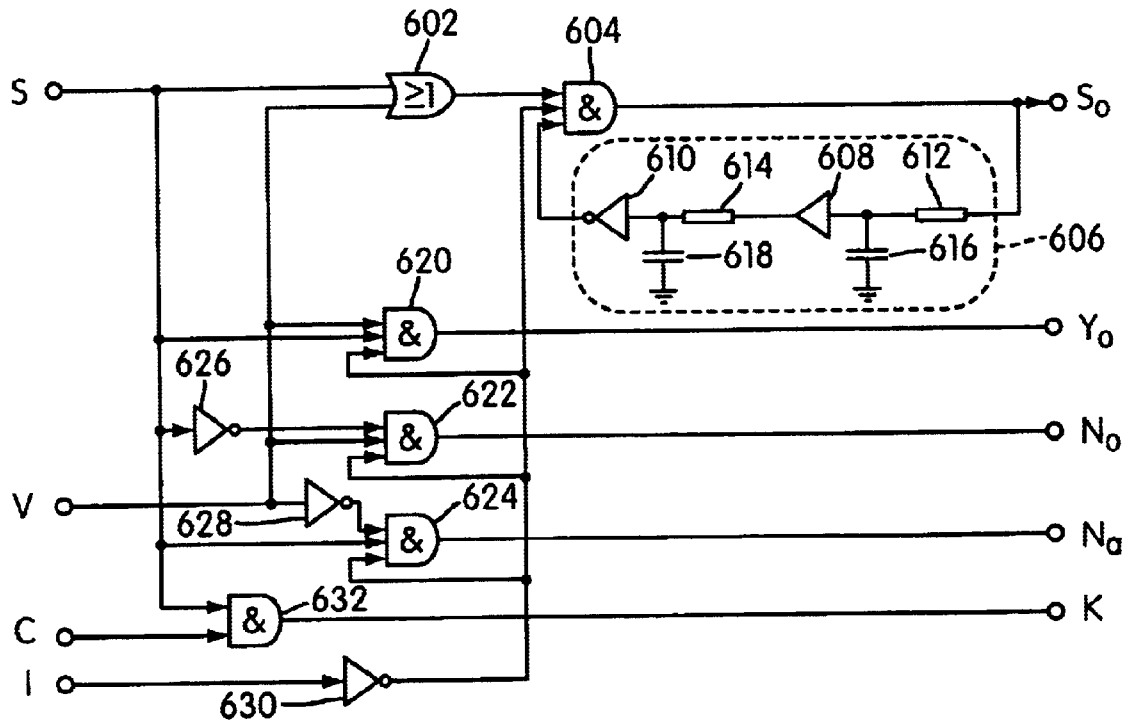

FIGS. 4 to 6 show an embodiment of the neuron according to the present invention in which the input and output signals are voltage signals. In the embodiment of FIGS. 4 to 6 the signal is called 'active', if its voltage is positive, and 'inactive', if its voltage is substantially zero.

FIG. 4 shows a way of implementing the synapses $21_1$ to $21_n$ of the neuron of FIG. 3. In this solution the voltage corresponding to the weighting coefficient of the synapse is stored through a resistor 41 and a diode 42 in a capacitor 43 always when auxiliary signal $A_1$ and the main signal S are simultaneously active. (A possible association between the main signal S and the key signal K is described in connection with gate 632 of FIG. 6.) The resistor 41 and the capacitor 43 define a time constant by which the voltage of the capacitor 43 grows. The diode 42 inhibits the voltage from discharging through an AND gate 40. The voltage of the capacitor 43 is supplied to an operational amplifier 44 functioning as a voltage follower, the input impedance of the amplifier being very high (i.e. the discharging of the capacitor 43 caused by it is negligible). The output of the synapse is signal $At_1$, which is obtained from input signal $A_1$ by locking it at the voltage level corresponding to the weighting coefficient by a diode 45 and a resistor 46. A second voltage follower 47 buffers the output signal. Always when input signal $A_1$ is active, output signal $At_1$ is proportional to the current value of the weighting coefficient.

FIG. 5 shows a way of implementing the summing block 12 of the neuron of FIG. 3. The voltages $At_1$ to $At_3$ obtained from synapses $21_1$ to $21_3$ are summed by a resistor network 50 to 53. (It is readily noticeable that the number of the inputs $At_1$ to $At_3$ and that of the resistors 51 to 53 are arbitrary.) The thresholding is performed by a comparator 54, and the thresholding is here abrupt so that the output of the comparator 54 is active only when the summed voltage U in the positive input of the comparator 54 exceeds the threshold value in the negative input (the threshold value in the example of FIG. 5 being the output voltage of a constant voltage power source 55).

FIG. 6 shows a way of implementing the nucleus 22 of the neuron of FIG. 3. An OR circuit 602 generates a main output signal $S_O$ if the inputted main signal S is active or the thresholded summed voltage V is active. The nucleus 22 contains a block 606, indicated by a dotted line, functioning as a delay circuit. In the example of FIG. 6 the delay circuit 606 comprises a buffer 608 and an inverter 610, resistors 612 to 614 and capacitors 616 to 618. Normally the output of the delay circuit 606 is active, so an AND gate 604 allows an output signal to pass through. When the delay caused by the structure of the components of the delay circuit 606 has passed, the output pulse, inverted, reaches the AND gate 606 and deactivates the main output $S_O$. $S_O$ cannot be re-activated until the delayed output pulse in the output of the delay circuit 606 has ended. A logical AND operation $Y_O$ is formed by AND circuit 620: the first element in the operation is the main signal S and the second element is a summed signal V weighted by the weighting coefficients of the auxiliary signals $A_1$ to $A_3$ and subsequently thresholded. A corresponding AND operation $N_O$ is formed by AND circuit 622, with the exception that the inverse value of the main signal S has been first formed (i.e. the signal has been inverted) by NO circuit 626. The corresponding AND operation $N_a$ is formed by AND circuit 624, with the exception that the thresholded summed signal V has been first inverted by NO circuit 628. All the outputs can be inhibited by an I signal, which is (here) inverted by NO circuit 630 and then supplied, in the inverted form, to AND circuits 604, 620, 622 and 624. The synapses are controlled by a K signal in accordance with the Hebb rule (cf. FIG. 2). A control signal C is used to define when learning is allowed at all. The generation of the key signal K is inhibited by AND circuit 632 when the control signal C is inactive.

The additional output signals $Y_O$, $N_o$ and $N_a$ of the neuron according to the invention can be used, for example, as follows. An active signal $Y_O$ (Y="Yes") means that the main signal S and the auxiliary signals $A_1$ correspond to each other, i.e. they have been associated. An active signal $N_o$ (N="No") means that the main signal S and the auxiliary signals $A_1$ do not correspond to each other. The auxiliary signal $A_1$ is thus active, but the main signal S is not. An active signal $N_a$ ("No association") indicates a situation where the main signal S is active but the auxiliary signal $A_1$ is not. One characteristic of the neural network is its ability to predict a situation. An active signal $N_a$ indicates that there is a new input signal S which is not predicted by the auxiliary signals $A_1$. Signal $N_a$ is thus a 'surprise indicator', which can be used to draw attention to new, surprising signals.

The control signal C controls, or keys, the K signal. It is not expedient for the network to learn all the situations that occur. When a normal human being encounters a new situation, he/she either concludes or instinctively knows whether the situation is worth learning. This kind of focusing of attention can be simulated by the control signal C.

In the above example the auxiliary signals $A_1$ to $A_n$ can be given continuously changing values and the main signal S can be given two different values. The threshold function is here a simple comparative operation. The invention is not limited to the above, but it can be applied more broadly, for example, so that the main signal S and the key signal K can also be given continuous values. The threshold function can be replaced with any appropriate non-linear continuous or step function. The neuron's learning is then not limited to two mutually exclusive situations: allowed or inhibited. Instead, the learning process is divided into different degrees or it is a continuum of degrees, whereby the strength of the K signal is adjusted on the basis of the main signal S. In the normal state of the neural network (when the network is not being trained), the key signal K is not more than a fraction of the main signal S, if the S signal is active. When the network is to be trained, the value of the key signal K approaches the value of the main signal S. In practice, the binary AND gates in FIGS. 4 and 6 should be replaced, for example, with analogue multipliers or adjustable amplifiers or attenuators or the like.

In practice, a huge number of neurons (usually $10^4$ to $10^6$) are needed in neural networks. The neuron of the invention can be implemented by a process suitable to large-scale integration, for example by the EEPROM technique, which is used to manufacture the speech storage circuits implemented by semi-conductors. Alternatively, the neurons and the neural network can be simulated by a computer program executed in a digital processor. The values corresponding to the weighting coefficients of the synapses of the neurons are here stored in memory locations (e.g. in a matrix variable) and the other parts of the neuron are implemented by software logic.

The invention can be applied in areas where information is processed using extensive artificial neural networks. The areas include, for example, processing of audiovisual information, interpretation of sensory information in general and of speech and image in particular, and formation of response. The invention is applicable in many modern fields of industry, such as human/machine interfaces, personal electronic assistants and/or means of communication, multimedia, virtual reality, robotics, artificial intelligence and artificial creativity.

It will be obvious to a person skilled in the art that with the advancement of technology, the basic idea of the invention can be implemented in many different ways. The invention and its embodiments are thus not limited to the above examples but they can vary within the scope of the claims.

What is claimed is:

1. A method of forming output signals of an associative artificial neural network, the method comprising;

receiving a number of auxiliary signals;

forming a corresponding weighting coefficient for each auxiliary signal;

forming from the auxiliary signals a sum weighted by the corresponding coefficients;

applying a non-linear function to the weighted sum to generate a non-linear signal V;

receiving a main signal S, which can be associated with the auxiliary signals such that the weighting coefficient of each auxiliary signal is increased when the main signal S and said auxiliary signal are simultaneously active; and forming, based on the main signal S and the non-linear signal V, a function S OR V, which is used to generate a main output signal, and at least one of three logical functions, including S AND V, NOT S AND V, and S AND NOT V, and using said at least one logical function to generate an additional output signal for the associative artificial neural network.

2. The method of claim 1, wherein the non-linear function is a threshold function, and the non-linear signal V is obtained by the threshold function has a first state and a second state.

3. The method of claim 1, wherein the non-linear function is a step function with more than two steps.

4. The method of claim 1, wherein the non-linear function is a continuous function.

5. The method of claim 1, wherein the main output signal has a first state and a second state and the method further comprises setting an upper limit to a length of time that the main output signal is in the second state.

6. The method of claim 5, further comprising setting a lower limit to a length of time that the main output signal remains in the first state after having been in the second state.

7. The method of claim 1, further comprising adjusting a learning of the associative artificial neuron in response to an external control signal.

8. The method of claim 7, wherein adjusting the learning of the associative artificial neuron has two states, whereby the learning of the associative artificial neuron is either allowed or inhibited.

9. The method of claim 8, further comprising forcing at least one output signal to a predetermined state in response to an external inhibiting signal.

10. The method of claim 7, further comprising forcing at least one output signal to a predetermined state in response to an external inhibiting signal.

11. The method of claim 1, further comprising forcing at least one output signal to a predetermined state in response to an external inhibiting signal.

12. An associative artificial neuron comprising:

means for receiving a number of auxiliary signals and forming a corresponding coefficient for each auxiliary signal;

means for forming from the auxiliary signals a sum weighted by the corresponding coefficients;

means for applying a non-linear function to the weighted sum to generate a non-linear signal V;

means for receiving a main signal S, which can be associated with the auxiliary signals such that said weighting coefficient for each auxiliary signal is increased when the main signal S and said auxiliary signal are simultaneously active; and means for forming, based on the main signal S and the non-linear signal V, a function S OR V, which is used to generate a main output signal, and at least one of three logical functions, including S AND V, NOT S AND V, and S AND NOT V, and using said at least one logical function to generate an additional output signal for the associative artificial neuron.

13. An associative artificial neuron according to claim 12, wherein said non-linear function is a threshold function and the non-linear signal V is obtained by the threshold function has a first state and a second state.

14. An associative artificial neuron according to claim 12, wherein the non-linear function is a step function with more than two steps.

15. An associative artificial neuron according to claim 12, wherein the non-linear function is a continuous function.

16. An associative artificial neuron according to claim 12, wherein said main output signal has a first state and a second state and the associative artificial neuron further comprises means for setting an upper limit to a length of time that said main output signal is in the second state.

17. An associative artificial neuron according to claim 16, further comprising means for setting a lower limit to a length of time that said main output signal remains in the first state after having been in the second state.

18. An associative artificial neuron according to claim 12, further comprising means for adjusting a learning of the associative artificial neuron in response to an external control signal.

19. An associative artificial neuron according to claim 18, wherein the means for adjusting the learning of the associative artificial neuron has two states, whereby the learning of the associative artificial neuron is either allowed or inhibited.

20. An associative artificial neuron according to claim 18, further comprising means for forcing at least one output signal to a predetermined state in response to an external inhibiting signal.

21. An associative artificial neuron according to claim 12, further comprising means for forcing at least one output signal to a predetermined state in response to an external inhibiting signal.

22. An associative artificial neuron according to claim 19, further comprising means for forcing at least one output signal to a predetermined state in response to an external inhibiting signal.

* * * * *